(12) United States Patent
Jabal et al.

(10) Patent No.: US 12,714,006 B2
(45) Date of Patent: Aug. 25, 2026

(54) FURROW OPENER LINKAGE AND TRANSPORT ORIENTATION

(71) Applicant: K-HarT Industries Ltd., Elrose (CA)

(72) Inventors: Arvinder Singh Jabal, Elrose Saskatchewan (CA); Russell George Lyons, Elrose Saskatchewan (CA); Kim Hartman, Elrose Saskatchewan (CA)

(73) Assignee: K-Hart Industries Ltd., Elrose (CA)

( * ) Notice: Subject to any disclaimer, the term of this patent is extended or adjusted under 35 U.S.C. 154(b) by 507 days.

(21) Appl. No.: 18/272,818

(22) PCT Filed: Jan. 18, 2022

(86) PCT No.: PCT/CA2022/050065
§ 371 (c)(1),
(2) Date: Jul. 18, 2023

(87) PCT Pub. No.: WO2022/155731
PCT Pub. Date: Jul. 28, 2022

(65) Prior Publication Data

US 2024/0081172 A1 Mar. 14, 2024

(30) Foreign Application Priority Data

Jan. 19, 2021 (CA) ...................................... 3106603

(51) Int. Cl.
*A01B 63/32* (2006.01)
*A01B 63/00* (2006.01)
(Continued)

(52) U.S. Cl.
CPC ............ *A01C 7/208* (2013.01); *A01B 63/008* (2013.01); *A01B 63/32* (2013.01); *A01B 73/046* (2013.01); *A01B 73/048* (2013.01); *A01C 7/201* (2013.01)

(58) Field of Classification Search
CPC ......... A01C 7/201; A01C 7/208; A01B 63/32; A01B 63/008; A01B 73/048
See application file for complete search history.

(56) References Cited

U.S. PATENT DOCUMENTS 4,534,416 A * 8/1985 Johnson ................. A01B 63/22 172/466
4,726,303 A 2/1988 Degelman et al.
(Continued)

FOREIGN PATENT DOCUMENTS

WO 2019010239 A1 1/2019

OTHER PUBLICATIONS

ISA/CA, International Search Report and Written Opinion in International Application No. PCT/CA2022/050065 dated Apr. 14, 2022, 11 pages.

*Primary Examiner* — Alicia Torres
(74) *Attorney, Agent, or Firm* — NK Patent Law

(57) ABSTRACT

A seeding apparatus includes an implement frame and front and rear frame members are pivotally mounted to the implement and furrow openers mounted to each. In an operating position the front and rear furrow openers are engaged in the ground and separated by an operating distance, and can be raised to an idle position where the furrow openers are above the ground and the front and rear furrow openers are separated by an idle distance that is greater than the operating distance. The implement frame has an inner wing pivotally attached to a center frame, and an outer wing pivotally attached to the inner wing. The inner wing section pivots upward and the outer wing section pivots downward supported by a transport wheel. When in the transport position the inner and outer wing sections extend upward from the center frame section and the transport wheel is above the ground.

10 Claims, 11 Drawing Sheets

(51) Int. Cl.
*A01B 73/04* (2006.01)
*A01C 7/20* (2006.01)

(56) References Cited

U.S. PATENT DOCUMENTS

| | | | | |
|---|---|---|---|---|
| 6,494,154 | B2 * | 12/2002 | Kinzenbaw | A01C 7/208 172/311 |
| 6,588,351 | B1 * | 7/2003 | Hall | A01B 73/04 111/59 |
| 2007/0245938 | A1 * | 10/2007 | Bourgault | A01C 7/203 111/156 |
| 2011/0284253 | A1 | 11/2011 | Stevenson | |
| 2020/0359541 | A1 * | 11/2020 | Ptacek | A01B 63/008 |

* cited by examiner

FURROW OPENER LINKAGE AND TRANSPORT ORIENTATION

CROSS-REFERENCE TO RELATED APPLICATIONS

This application is a U.S. National Stage Application of International Application No. PCT/CA2022/050065, filed Jan. 18, 2022, which claims priority to CA Ser. No. 3,106,603, filed Jan. 19, 2021, the entire contents of all of which are incorporated by reference herein in their entirety for all purposes.

This disclosure relates to the field of agricultural implements and in particular a linkage and transport orientation for a furrow opener implement.

BACKGROUND

Seeding implements typically have two or more rows of furrow openers mounted on lateral frame members spaced between the front and rear of the implement frame. The implement frame may be vertically stationary, with the furrow openers pivotally attached to the frame members so the furrow openers pivot downward with respect to the frame members to engage the ground, and then upward to disengage. Alternatively it is also known to fix the furrow openers to the frame members and then the implement frame up and down to engage and disengage the ground.

When the implement is travelling in the operating travel direction the opener rows are perpendicular to the operating travel direction, and the furrows made by the openers are thus parallel to each other and equally spaced across the width of the implement at the designed furrow spacing.

Often however uneven forces acting on the implement cause the implement to skew, such that the opener rows are at an angle to the operating travel direction that is not perpendicular, but inclined in one direction or the other. These forces are caused by unequal soil conditions across the width of the implement, uneven ground penetration of ground engaging tools on the implement, uneven wear on ground engaging tools, by gravity when travelling on hill sides, and like conditions. U.S. Pat. No. 8,668,024 to Beaujot provides a system for correcting skewing in an agricultural implement by using drag forces to maintain the implement perpendicular to the operating travel direction.

The spacing of the furrow opener on each opener row of course stays the same, but as the opener rows incline with respect to the travel direction the lateral location of the furrow openers on the rear row can change significantly with respect to the lateral location of the furrow openers on the front row. The longer the distance between the front opener row and the rear opener row, the greater the change in the spacing of the furrows made by the furrow openers on the front opener row and those made by openers on the rear opener row. Thus where, for example, there are two rows of furrow openers spaced along each row at 20 inches to achieve a 10 inch spacing, the skewing can result in a row spacing for example of 15 inches and 5 inches.

Moving the front and rear furrow opener rows closer together can reduce the effects of skewing. Ground engaging tools require periodic replacement and the furrow openers and linkages supporting them also require periodic maintenance and moving the rows of front and rear furrow openers closer together makes access to the openers challenging.

Such seeding implements typically comprise an implement frame with a center section and a plurality of wing sections pivotally attached to each other such that the wing sections can flex with respect to each other to follow ground contours when in a field position, and then can be folded about the pivot axes to a narrow position for transport.

U.S. Pat. No. 3,844,358 to Shuler et al. and U.S. Pat. No. 3,948,327 to Parker et al. show a five section implement where the outer wing sections are folded over the inner wing sections and then the inner wing sections move upward to the transport position.

U.S. Pat. No. 7,497,269 to Jagow and U.S. Pat. No. 9,596,800 to Sudbrink et al. show a seven section implement where the outer and middle wing sections are folded over the inner wing sections and then the inner wing sections move upward to the transport position.

U.S. Pat. No. 4,191,260 to Kindworth shows an eleven section implement where the pivot axis between the two most outer wing sections E and D moves upward so the wing section E rolls along the ground on a wheel toward wing section D, and the wing sections ED are then folded over the wing section C. Then the pivot axis between wing section C and wing section B is moved up again so wing section C moves toward wing section B, and wing section B, with attached wing sections E,D,C is folded onto the top of wing section A and wing section A is moved to a vertical transport position.

SUMMARY OF THE INVENTION

The present disclosure provides a seeding apparatus that overcomes problems in the prior art.

In a first embodiment the present disclosure provides a seeding apparatus comprising an implement frame mounted on wheels for travel along the ground in an operating travel direction. Front and rear frame members are pivotally mounted to the implement frame and extend laterally substantially perpendicular to the operating travel direction. A plurality of front furrow openers is mounted on the front frame member and a plurality of rear furrow openers is mounted on the rear frame member. The front and rear frame members are movable from an operating position, where the front and rear furrow openers are engaged in the ground and the front and rear furrow openers are separated by an operating distance, to an idle position where the front and rear furrow openers are above the ground and the front and rear furrow openers are separated by an idle distance that is greater than the operating distance.

In a second embodiment the present disclosure provides an implement frame apparatus comprising a center frame section mounted on center wheels for movement along the ground in an operating travel direction, with an inner wing section pivotally attached to an end of the center frame section about an inner pivot axis oriented substantially parallel to the operating travel direction. The inner wing section is movable from a field position, extending laterally outward from the center frame section, to a transport position extending upward from the center section and above the center section such that the center frame section extends laterally beyond wing furrow openers on the inner wing section when the inner wing section is in the transport position. A transport actuator mounted to the center frame section is operative to pivot the inner wing section upward about the inner pivot axis.

In a third embodiment the present disclosure provides an implement frame apparatus comprising a center frame section mounted on center wheels for movement along the ground in an operating travel direction. An inner wing section is pivotally attached to an end of the center frame section about an inner pivot axis oriented substantially parallel to the operating travel direction, and an outer wing section is pivotally attached to an outer end of the inner wing section about an outer pivot axis oriented substantially parallel to the operating travel direction. The inner and outer wing sections are movable from a field position, extending laterally outward from the center frame section, to a transport position extending upward from the center section. A transport wheel is mounted about a transport caster axis to an outer end of the outer wing, and a wheel actuator is operative to pivot the transport wheel about the transport caster axis from a first position, where a rotational axis of the transport wheel is oriented substantially perpendicular to the operating travel direction and the transport wheel supports a rear end of the outer wing section in the field position, to a second position where the rotational axis of the transport wheel is oriented substantially parallel to the operating travel direction and supports a rear end of the outer wing section when moving from the field position to the transport position. A transport actuator is mounted to the center frame section and is operative to pivot the inner wing section upward about the inner pivot axis. When moving from the field position to the transport position the inner wing section pivots upward about the inner pivot axis and the outer wing section pivots downward about the outer pivot axis supported by the transport wheel, and when in the transport position the inner wing section extends upward from the center frame section and the outer wing section extends upward with a bottom of the outer wing section next to a bottom of the inner wing section and the transport wheel is above the ground.

The present disclosure provides a raising and lowering arrangement for furrow openers on two rows which reduces the operating distance between the front and rear furrow openers when they are in the operating position to reduce variances in the row spacing, and then increases the idle distance between the two rows of furrow openers to facilitate maintenance. The apparatus can be configured as well to provide increased clearance between the furrow openers and the ground to further facilitate maintenance.

The present disclosure further provides an arrangement for pivoting inner and outer wing sections of an implement frame from a field position to a transport position where the wing sections extend upward above the center section, thus providing a wide implement that still has a narrow width when in the transport position.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
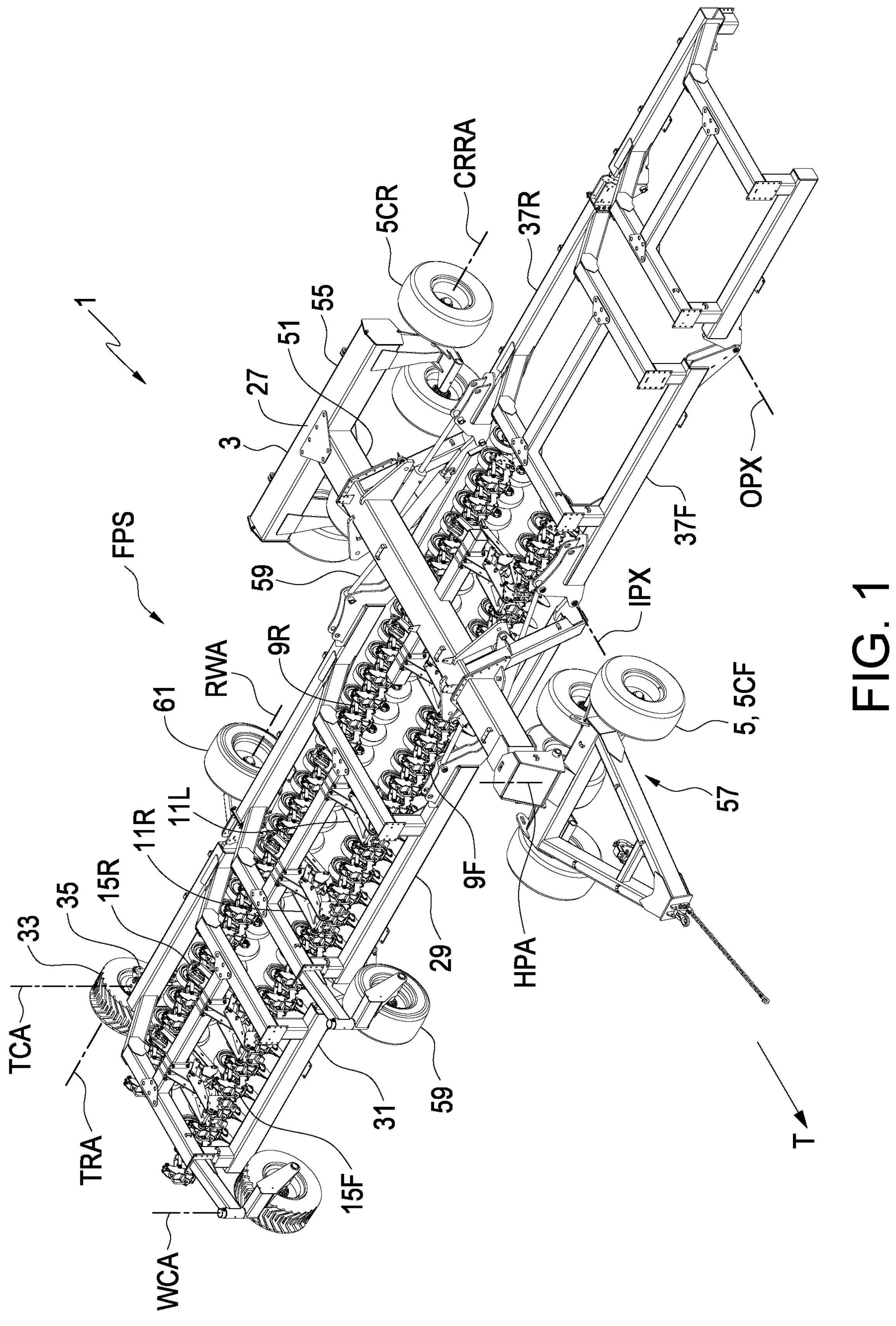
FIG. 1 is a schematic perspective view of an embodiment of the seeding apparatus of the present disclosure.
Figure 2:
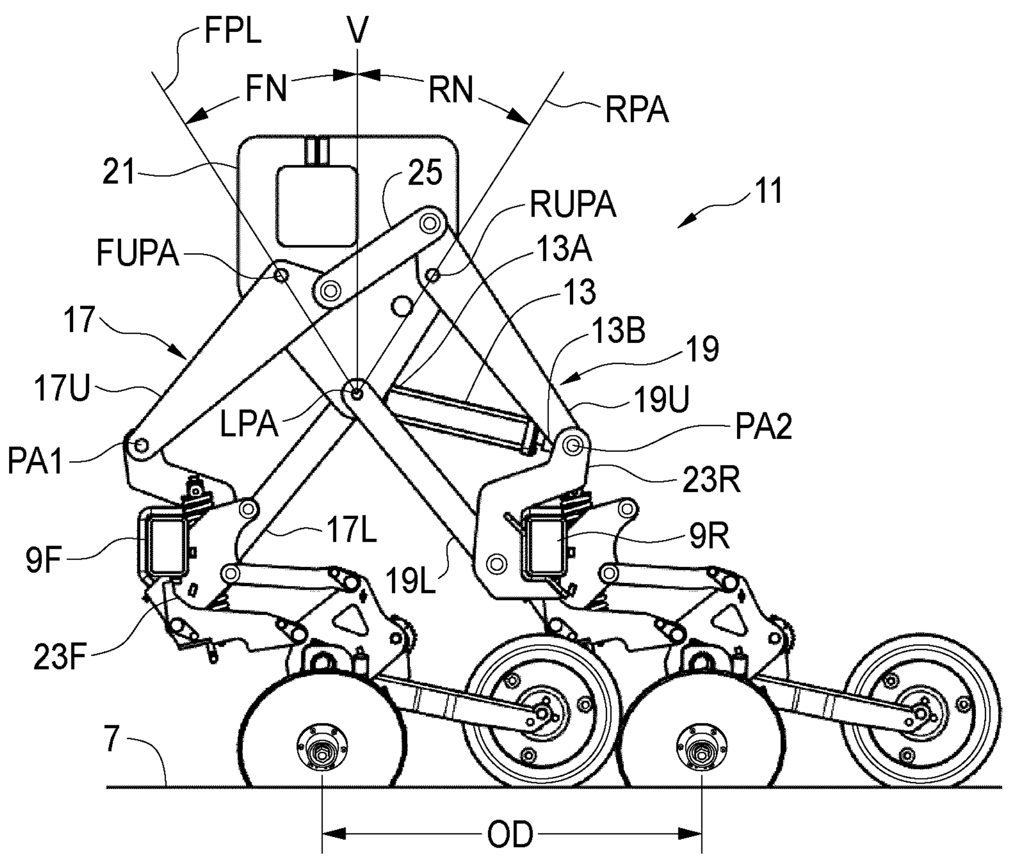
FIG. 2 is a side view of the raising linkage assembly of the embodiment of FIG. 1 with furrow openers in the operating position.
Figure 3:
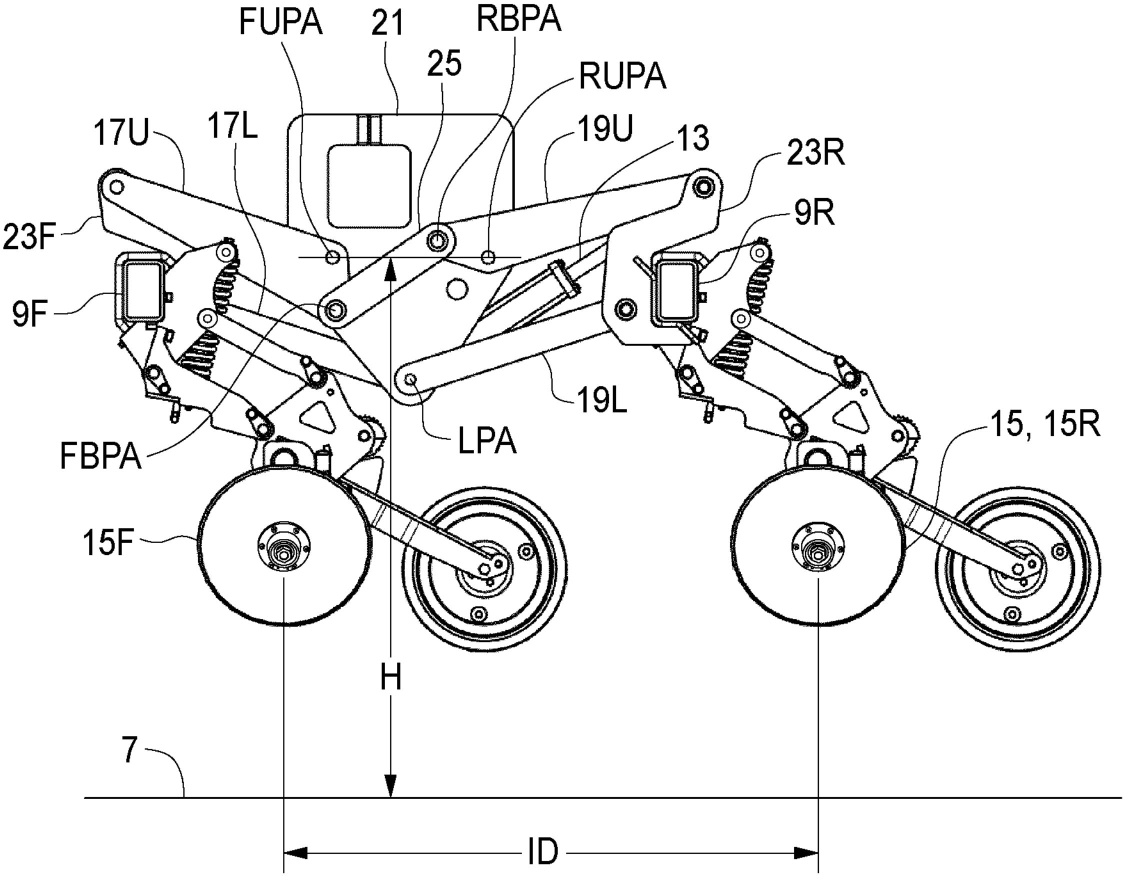
FIG. 3 is a side view of the raising linkage assembly of the embodiment of FIG. 1 with furrow openers in the idle position.
Figure 4:
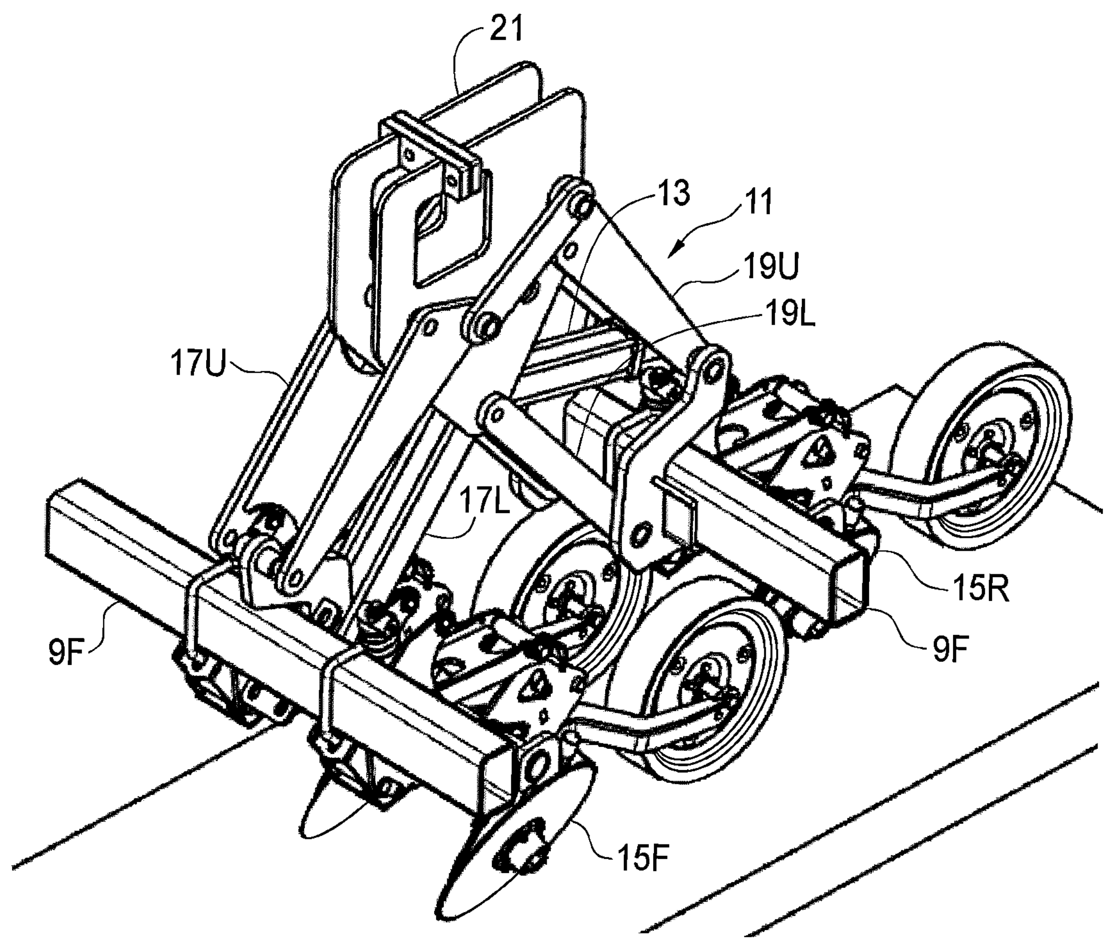
FIG. 4 is a perspective view of the raising linkage assembly of the embodiment of FIG. 1 with furrow openers in the operating position.

FIGS. 1-4 illustrate an embodiment of a seeding apparatus 1 of the present disclosure comprising an implement frame 3 mounted on wheels 5 for travel along the ground 7 in an operating travel direction T. Front and rear frame members 9F, 9R extend laterally substantially perpendicular to the operating travel direction T and are pivotally mounted to the implement frame 3 by corresponding right and left linkage assemblies 11R, 11L connected to the implement frame 3. Corresponding right and left actuators, illustrated as extendable hydraulic cylinders 13R, 13L operate the linkage assemblies 11F, 11R to move the right and left frame members 9F, 9R at the same time such that the frame members 9 are at all times the same vertical distance above the ground 7.

A plurality of front furrow openers 15F are mounted on the front frame member 9F and a plurality of rear furrow openers 15R are mounted on the rear frame member 9R. The front and rear frame members 9F, 9R are movable from an operating position shown in FIG. 2 where the front and rear furrow openers 15F, 15R are engaged in the ground 7 and separated by an operating distance OD, to an idle position shown in FIG. 3 where the front and rear furrow openers 15F, 15R are above the ground 7 and are separated by an idle distance ID that is greater than the operating distance OD. The linkage assemblies 11 are configured to move the front frame member 9F forward and move the rear frame member 9R rearward as the frame members 9 move upward from the operating position OP to the idle position IP to increase the distance between the front and rear rows of furrow openers 15 and thus facilitate access for maintenance. As can be seen the furrow openers 15 are well above the ground as well to further facilitate access.

The right and left linkage assemblies 11 each comprise a front parallel arm assembly 17 connected between a bracket 21 fixed to the implement frame 3 and the front frame member 9F. A front upper arm 17U and a front lower arm 17L of the front parallel arm assembly 17 slope forward and down when the front frame member 9F is in the operating position of FIG. 2, and the front upper arm 17U and front lower arm 17L slope forward and up when the front frame member 9 is in the idle position of FIG. 3.

Similarly the right and left linkage assemblies 11 each comprise a rear parallel arm assembly 19 connected between the bracket 21 and the rear frame member 9R. A rear upper arm 19U and a rear lower arm 19L of the rear parallel arm assembly 19 slope rearward and down when the rear frame member 9R is in the operating position of FIG. 2, and the rear upper arm 19U and rear lower arm 19L slope rearward and up when the rear frame member 9R is in the idle position of FIG. 3.

A rear end 17LR of the front lower arm 17L is pivotally attached to a lower pivot axis LPA defined by the bracket 21, and a front end 19LF of the rear lower arm 19L is pivotally attached to the same lower pivot axis LPA.

A rear portion 17UR of the front upper arm 17U is pivotally attached to a front upper pivot axis FUPA defined by the bracket 21, and a front portion 19UF of the rear upper arm 19U is pivotally attached to a rear upper pivot axis RUPA defined by the bracket 21.

The upper and lower front arms 17U, 17L are parallel and pivotally attached to a front base 23F fixed to the front frame member 9F, and similarly the upper and lower rear arms 19U, 19L are parallel and pivotally attached to a rear base 23R fixed to the rear frame member 9R.

The front upper pivot axis FUPA and the rear upper pivot axis RUPA are at the same distance H above the ground 7 and a forward pivot line FPL between the lower pivot axis LPA and the front upper pivot axis FUPA slopes forward at a forward angle FN with respect to vertical V, and a rearward pivot line RPL between the lower pivot axis LPA and the rear upper pivot axis RUPA slopes rearward at a rearward angle RN with respect to vertical V that is equal to the forward angle FN.

The front upper arm 17U is pivotally linked to the rear upper arm 19U by a pivot bar 25 such that vertical movement of one of the front and rear parallel arm assemblies 17, 19 causes the same vertical movement in the other of the front and rear arm assemblies 17, 19. As shown, the front upper arm 17U defines a front bar pivot axis FBPA rearward and downward from the front upper pivot axis FUPA and the rear upper arm 19U defines a rear bar pivot axis RBPA forward and upward from the rear upper pivot axis RUPA and the pivot bar 25 is pivotally attached to the front and rear bar pivot axes FBPA, RBPA.

The actuator provided by hydraulic cylinder 13 is pivotally attached at one end 13A to the lower pivot axis LPA and pivotally attached at the opposite end 13B to the front base 23F or to the rear base 23R and extension or retraction of the hydraulic cylinder 13 moves the linkage assemblies 11 as described. The upper front arm 17U is pivotally attached to the front base 23F at a first pivot axis PA1 and the upper rear arm 19U is pivotally attached to the rear base 23R at a second pivot axis PA2. The extendable hydraulic cylinder 13 is shown pivotally attached at the opposite end 13B thereof to the second pivot axis PA2, but could also be pivotally attached to the first pivot axis PA1.

The present disclosure provides a raising and lowering arrangement for furrow openers 15 on two rows 15F, 15R which reduces the operating distance OD between the front and rear furrow openers when they are in the operating position to reduce variances in the row spacing, and then increases the idle distance ID between the two rows of furrow openers 15F, 15R to facilitate maintenance.

The implement frame 3 comprises a center frame section 27 mounted on center wheels 5C for movement along the ground 7 in the operating travel direction T. An inner wing section 29 is pivotally attached to an end of the center frame section 27 about an inner pivot axis IPX oriented substantially parallel to the operating travel direction T. It is contemplated that where a narrower implement is desired the implement frame 3 will comprise only the center frame section 27 and an inner wing section 29 pivotally mounted on each side of the center frame section 27, However the present disclosure also provides an outer wing section 31 that is pivotally attached to an outer end of the inner wing section 29 about an outer pivot axis OPX also oriented substantially parallel to the operating travel direction T. In the field position of FIG. 1 the wings 29, 31 flex up and down about the inner and outer pivot axes IPX, OPX to follow field contours.

Figure 7:
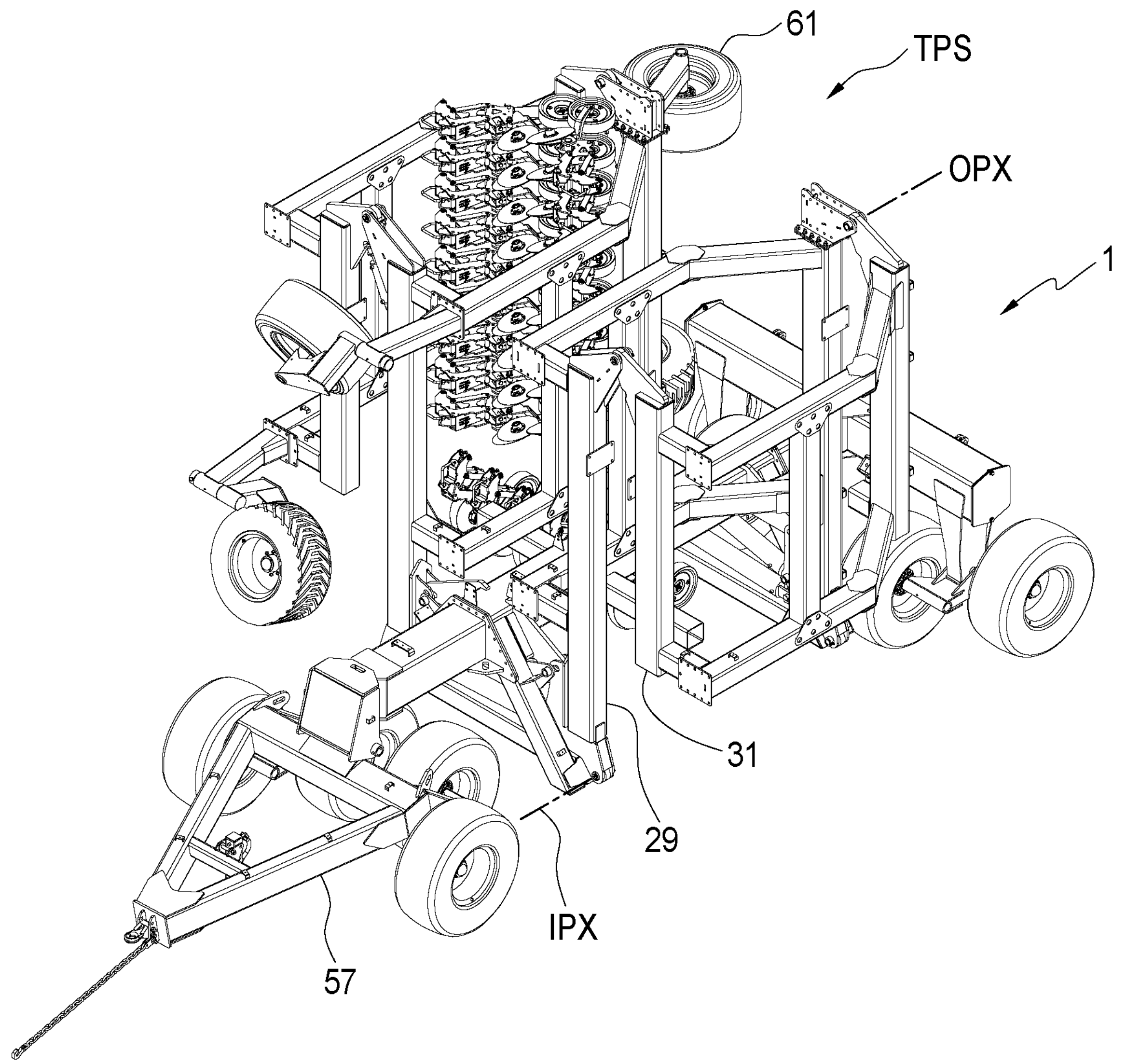
FIG. 7 is a perspective view of the embodiment of FIG. 1 in the full transport position.
Figure 8:
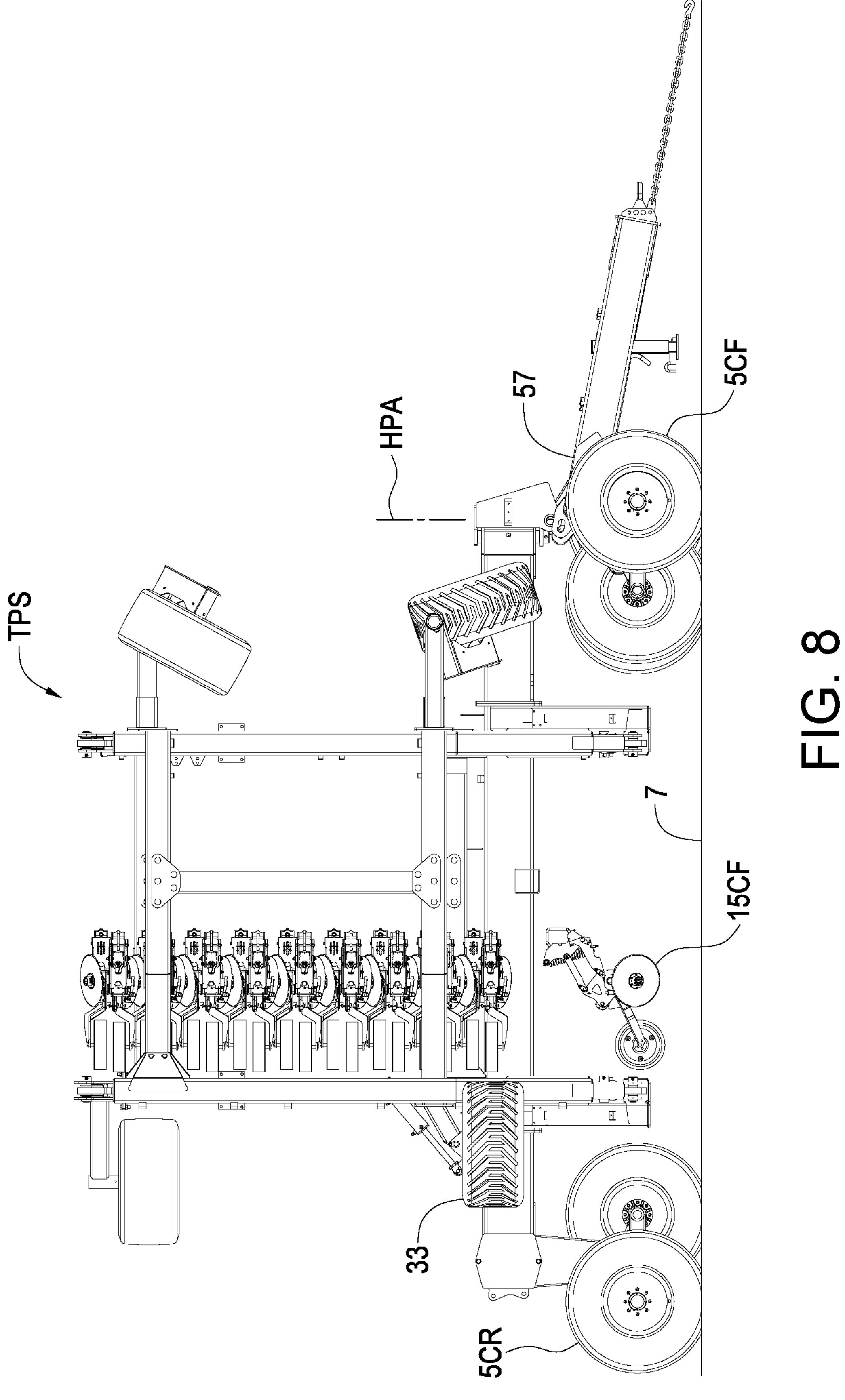
FIG. 8 is a side view of the embodiment of FIG. 1 in the full transport position.

As illustrated in FIGS. 5-10, the inner and outer wing sections 29, 31 are movable from the field position FPS shown in FIG. 1, extending laterally outward from the center frame section 27, to a transport position TPS shown in FIGS. 7 and 110 extending upward from the center section frame 27.

Figure 5:
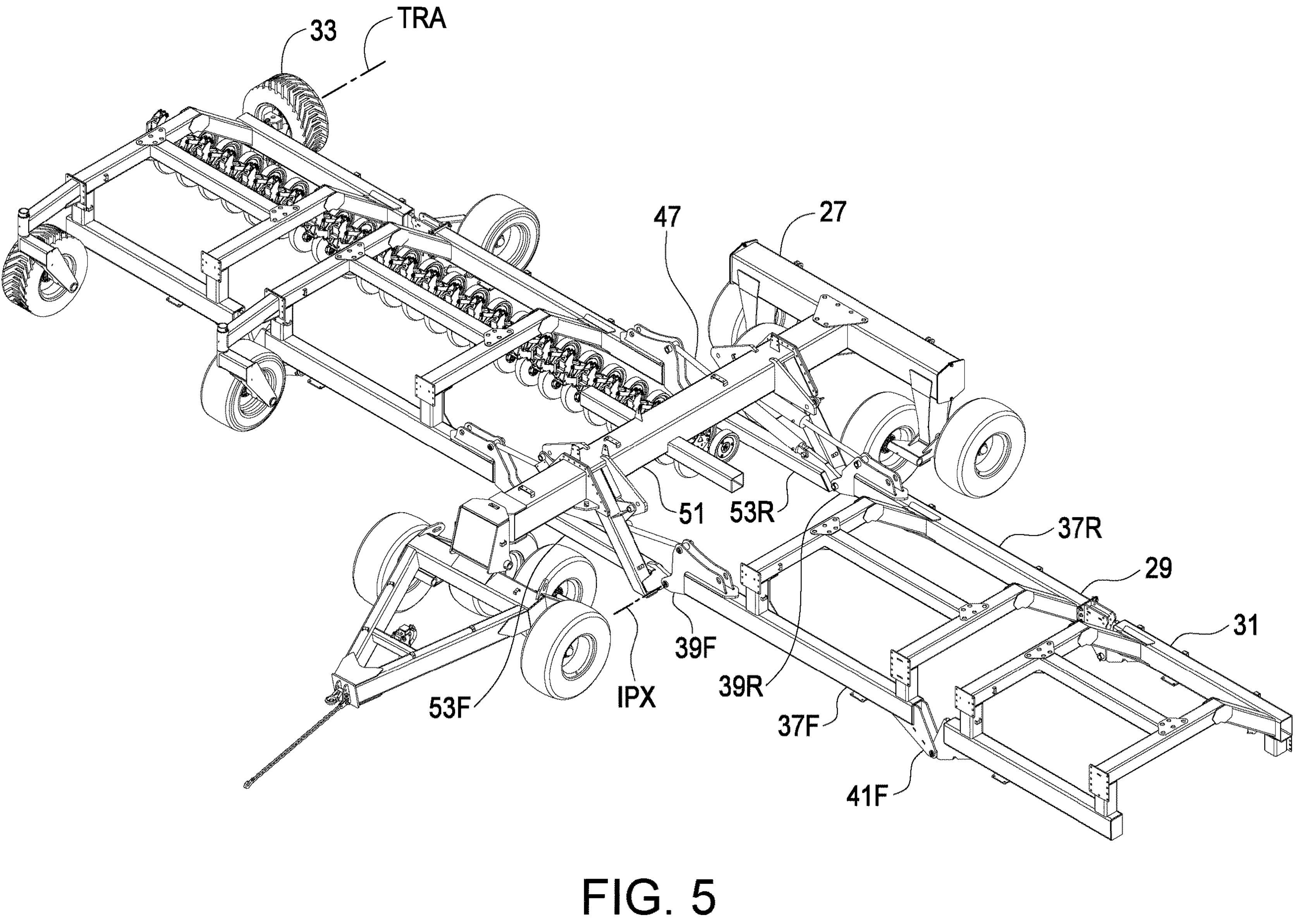
FIG. 5 is a perspective vie of the embodiment of FIG. 1 with the transport wheel turned to prepare for transition to the transport position.
Figure 6:
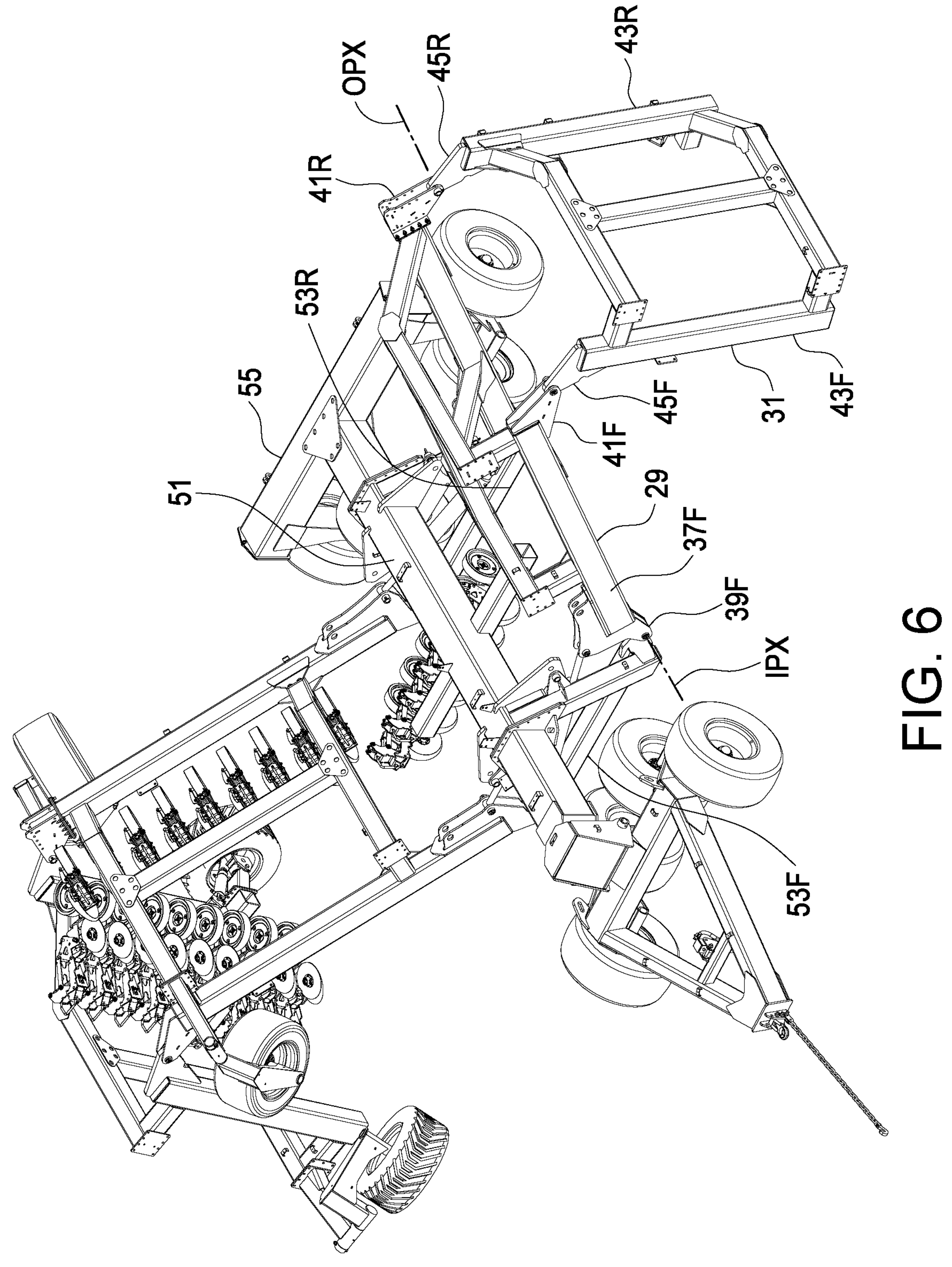
FIG. 6 is a perspective view of the embodiment of FIG. 1 in a partially folded position in the transition between the field position and the transport position.

A transport wheel 33 is mounted about a transport caster axis TCA to an outer end of the outer wing 31, and a wheel actuator 35 is operative to pivot the transport wheel 33 about the transport caster axis TCA from a first position shown in FIG. 1 where a rotational axis TRA of the transport wheel 33 is oriented substantially perpendicular to the operating travel direction T and the transport wheel 33 supports a rear end of the outer wing section 31 in the field position, to a second position shown in FIG. 5 where the rotational axis TRA of the transport wheel 33 is oriented substantially parallel to the operating travel direction T and supports a rear end of the outer wing section 31 when moving from the field position FPS to the transport position TPS.

When moving from the field position FPS to the transport position TPS, a transport actuator provided by hydraulic cylinder 47 pivots the inner wing section 29 upward about the inner pivot axis IPX and the outer wing section 31 pivots downward about the outer pivot axis OPX supported by the transport wheel 33 rolling along the ground toward the center section frame 27 until the inner wing section 29 lifts the transport wheel 33 off the ground as the inner wing section 31 approaches vertical.

Figure 11:
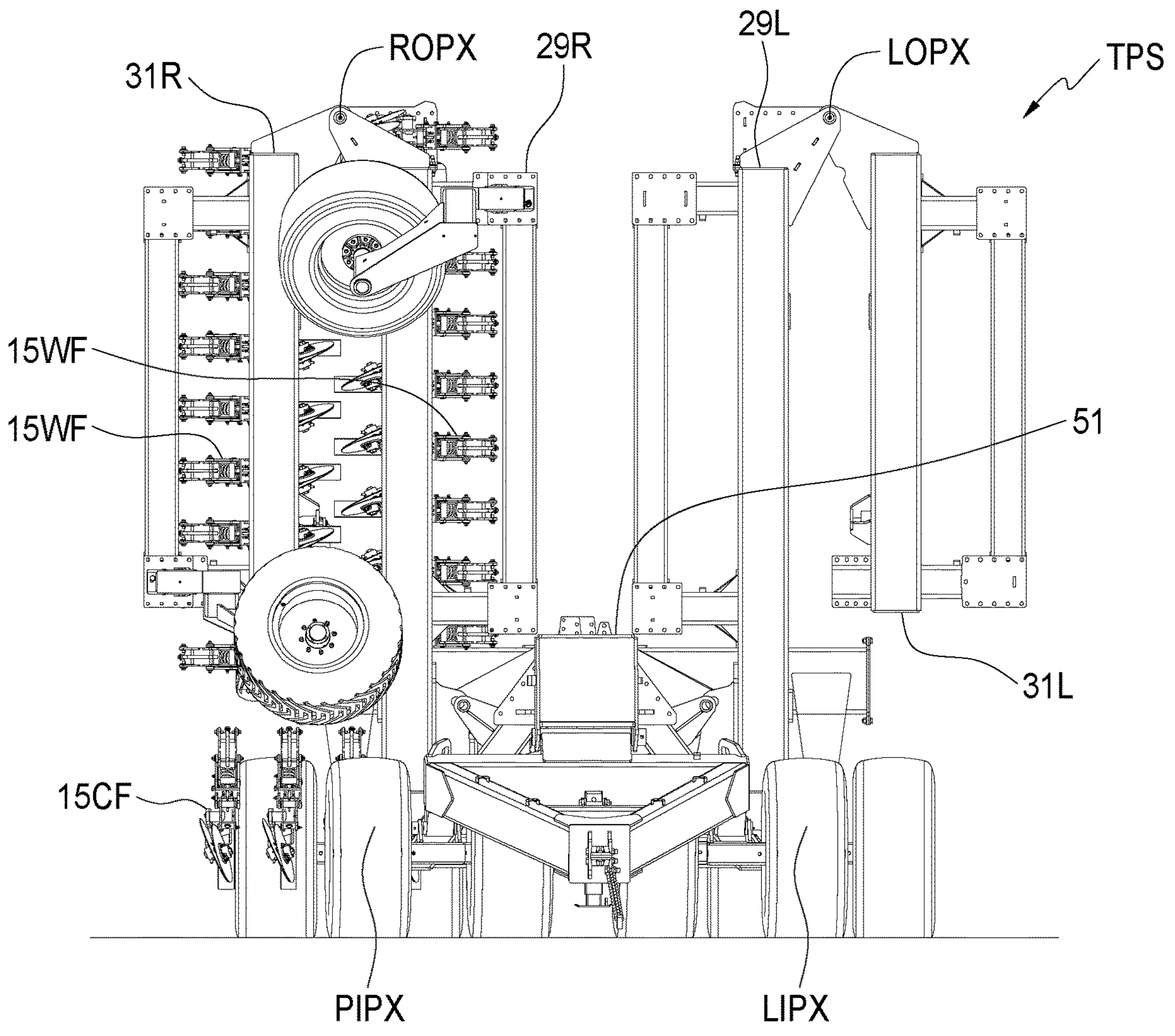
FIG. 11 is a front view of the embodiment of FIG. 1 in the full transport position.

Thus when in the transport position the inner wing section 29 extends upward from the center frame section 27 and the outer wing section 31 extends upward with a bottom 31B of the outer wing section 31 next to a bottom 29B of the inner wing section 29 and the transport wheel 33 is above the ground 7. The inner wing section 29 and outer wing section 31 are oriented substantially vertically above the center section 27 when in the transport position TPS as best seen in FIG. 11. It can also be seen in FIG. 11 that where only inner wing sections are present on each side of the center section, with no outer wings 31 present, the width of the total implement frame 3 when in the transport position is substantially equal to a width of the center frame section 27.

The inner wing section 29 comprises front and rear parallel inner wing beams 37F, 37R, and front and rear first brackets 39R, 39F extending downward from inner ends of each of the front and rear inner wing beams 37F, 37R, and front and rear second brackets 41F, 41R extending downward from outer ends of each of the front and rear inner wing beams 37R, 37F. Similarly the outer wing section 31 comprises front and rear parallel outer wing beams 43F, 43R and front and rear third brackets 45F, 45R extending downward from inner ends of each of the front and rear outer wing beams 43F, 43R.

The inner pivot axis IPX is defined by holes through the front and rear first brackets 39R, 39F, and the outer pivot axis OPX is defined by holes through the front second bracket 41F, the rear second bracket 41R, the front third bracket 45F, and the rear third bracket 45R.

A plurality of center furrow openers 15CF are movably mounted as described above to the center frame section 27 and a plurality of wing furrow openers 15WF are movably mounted to the inner and outer wing sections 29, 31 and laterally aligned with the center furrow openers 15CF. When in the transport position TPS, the wing furrow openers 15WF mounted on the inner wing sections 31 are above the center furrow openers 15CF mounted on the center frame section 27 reducing the width of the apparatus 1 when in transport.

In the illustrated apparatus 1 the center frame section 27 comprises a spine beam 51 oriented parallel to the operating travel direction T. A front pivot bracket 53F extends downward and laterally right and left from a front portion of the spine beam 51 and a rear pivot bracket 53R extends downward and laterally right and left from a rear portion of the spine beam 51. The inner pivot axis IPX extends through holes in lower portions of the front and rear pivot brackets 53F, 53R and the center furrow openers 15CF are located on both sides of the inner pivot axis IPX. This location of the inner pivot axis IPX allows the inner wing section 29 to pivot upward above the center furrow openers 15CF mounted on the center frame section 27.

A rear end of the spine beam 51 is fixed to a rear center beam 55 extending laterally from the spine beam 51 and the rear center beam is supported on center rear wheels 5CR that are rotatable on a rotational axes CRRA oriented perpendicular to the operating travel direction T. The front end of the spine beam 51 is pivotally attached to a front wheel and hitch assembly 57 about a substantially vertical hitch pivot axis HPA.

The center frame section 27 supports all the weight of the apparatus when in the TPS and so the rear center beam is supported by four large center rear wheels 5CR and the front end of the spine beam 51 is supported on four front wheels 5CF that pivot about the hitch pivot axis HPA to steer the implement. The inner and outer wing sections 29, 31 are supported on front caster wheels 59, each pivotally mounted about substantially vertical wing caster axes WCA, and on a rear wheel 61 rotatable about a rotational axis perpendicular to the operating travel direction T.

Figure 9:
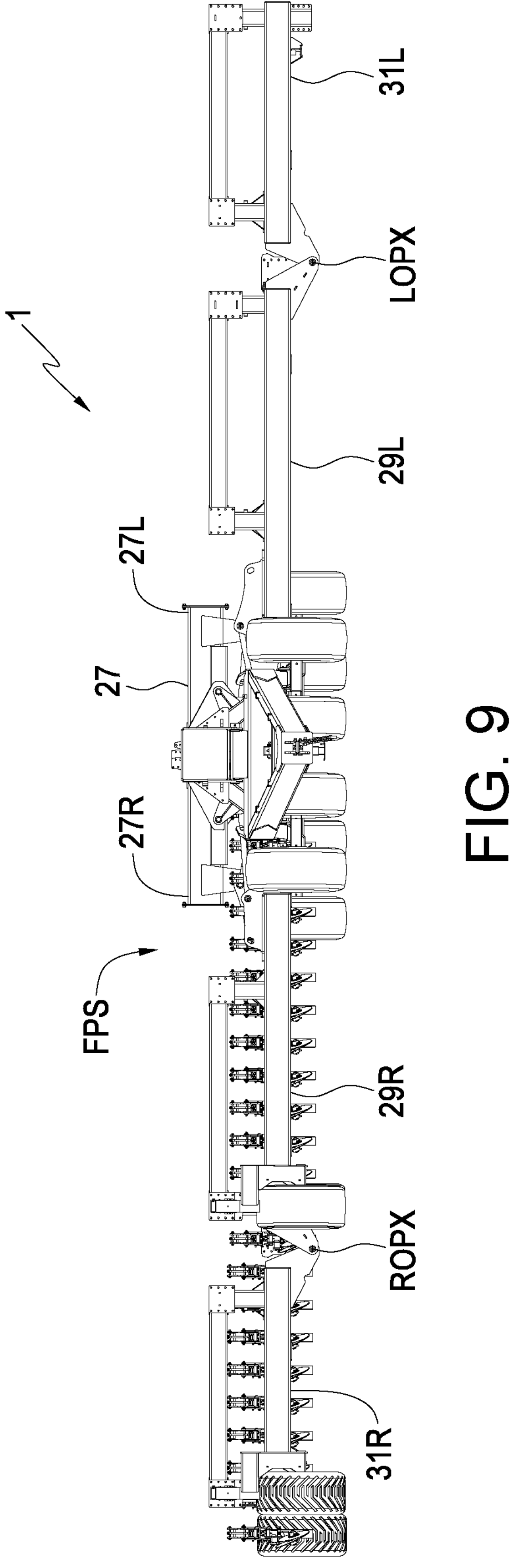
FIG. 9 is a front view of the embodiment of FIG. in the field position.

As illustrated in FIG. 9 the implement frame 3 comprises a right inner wing section 29R pivotally attached to the right end 27R of the center frame section 27 about a right inner pivot axis RIPX oriented substantially parallel to the operating travel direction and a left inner wing section 29L pivotally attached to a left end 27L of the center frame section 27 about a left inner pivot axis LIPX oriented substantially parallel to the operating travel direction. A right outer wing section 31R is pivotally attached to an outer end of the right inner wing section 29R about a right outer pivot axis ROPX oriented substantially parallel to the operating travel direction, and a left outer wing section 31L is pivotally attached to an outer end of the left inner wing section 29L about a left outer pivot axis LOPX oriented substantially parallel to the operating travel direction.

Figure 10:
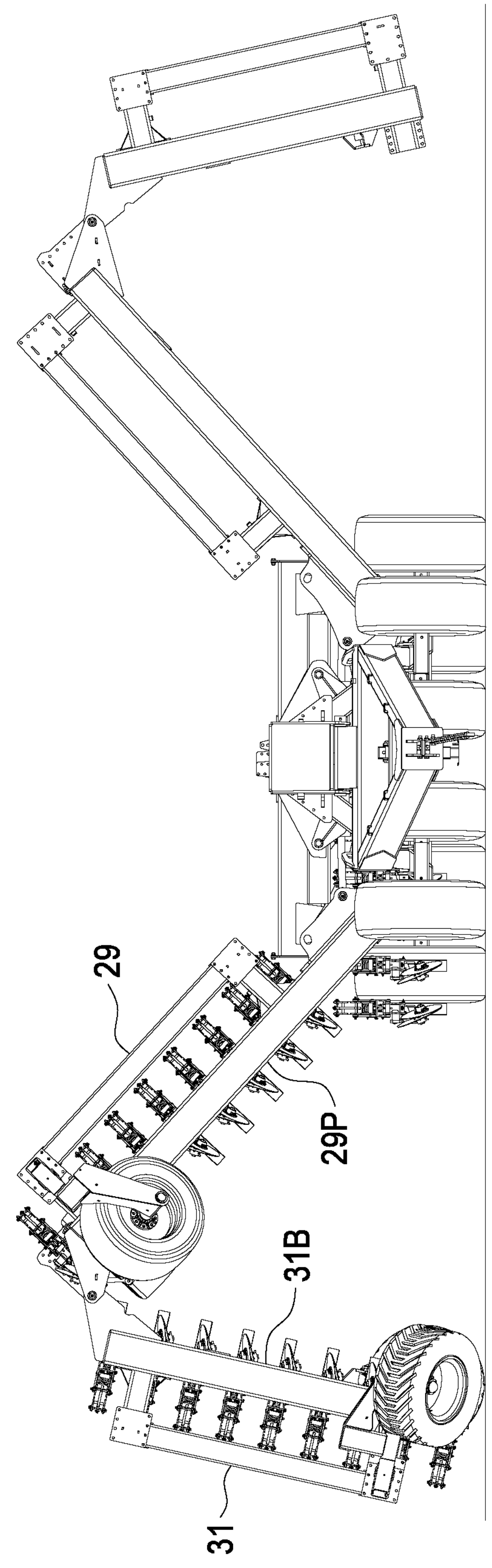
FIG. 10 is a front view of the embodiment of FIG. 1 in a partially folded position in the transition between the field position and the transport position.

The right and left inner and outer wing sections 29R, 29L, 31R 31L are movable from a field position FPS as shown in FIG. 9, extending laterally outward from the center frame section 27, to a transport position TPS shown in FIG. 11. As seen in FIG. 10 when moving from the field position to the transport position the right and left inner wing sections 29R, 29L pivot upward about the corresponding right and left inner pivot axes RIPX, LIPX and the right and left outer wing sections 31R, 31L pivot downward about the corresponding right and left outer pivot axis ROPX, LOPX. When in the final transport position as seen in FIG. 11, the right and left inner wing sections 29R, 29L extend upward from the center frame section 27 separated by a distance substantially equal to a width of the spine beam 55.

The present disclosure provides an arrangement for pivoting inner and outer wing sections 29, 31 of an implement frame 3 from a field position FPS to a transport position TPS where the wing sections extend upward above the center section 27, thus providing a wide implement that still has a narrow width when in the transport position.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A seeding apparatus comprising:

an implement frame mounted on wheels for travel along the ground in an operating travel direction;

front and rear frame members pivotally mounted to the implement frame and extending laterally substantially perpendicular to the operating travel direction;

a plurality of front furrow openers mounted on the front frame member and a plurality of rear furrow openers mounted on the rear frame member;

wherein the front and rear frame members are movable from an operating position, where the front and rear furrow openers are engaged in the ground and the front and rear furrow openers are separated by an operating distance, to an idle position where the front and rear furrow openers are above the ground and the front and rear furrow openers are separated by an idle distance that is greater than the operating distance.

2. The apparatus of claim 1 wherein the front and rear frame members are mounted to corresponding right and left linkage assemblies connected to the implement frame, and wherein right and left actuators are operative to pivot the corresponding right and left linkage assemblies to move the front and rear frame members between the operating position and the idle position.

3. The apparatus of claim 2 wherein each of the right and left linkage assemblies comprises:

a front parallel arm assembly connected between a bracket fixed to the implement frame and the front frame member, and wherein a front upper arm and a front lower arm of the front parallel arm assembly slope forward and down when the front frame member is in the operating position, and the front upper arm and front lower arm slope forward and up when the front frame member is in the idle position;

a rear parallel arm assembly connected between the bracket and the rear frame member, and wherein a rear upper arm and a rear lower arm of the rear parallel arm assembly slope rearward and down when the rear frame member is in the operating position, and the rear upper arm and rear lower arm slope rearward and up when the rear frame member is in the idle position.

4. The apparatus of claim 3 wherein:

a rear end of the front lower arm is pivotally attached to a lower pivot axis defined by the bracket, and a front end of the rear lower arm is pivotally attached to the lower pivot axis;

a rear portion of the front upper arm is pivotally attached to a front upper pivot axis defined by the bracket, and a front portion of the rear upper arm is pivotally attached to a rear upper pivot axis defined by the bracket;

wherein the front upper pivot axis and the rear upper pivot axis are at substantially the same distance above the ground; and wherein a forward pivot line between the lower pivot axis and the front upper pivot axis slopes forward at a forward angle with respect to vertical;

wherein a rearward pivot line between the lower pivot axis and the rear upper pivot axis slopes rearward at a rearward angle with respect to vertical that is substantially equal to the forward angle.

5. The apparatus of claim 4 wherein the front upper arm is pivotally linked to the rear upper arm by a pivot bar such that vertical movement of one of the front and rear parallel arm assemblies causes substantially the same vertical movement in the other of the front and rear arm assemblies.

6. The apparatus of claim 5 wherein the front upper arm defines a front bar pivot axis rearward and downward from the front upper pivot axis and the rear upper arm defines a rear bar pivot axis forward and upward from the rear upper pivot axis and the pivot bar is pivotally attached to the front and rear bar pivot axes.

7. The apparatus of claim 4 wherein the upper and lower front arms are parallel to each other and pivotally attached at front ends thereof to a front base fixed to the front frame member, the upper and lower rear arms are parallel to each other and pivotally attached at rear ends thereof to a rear base fixed to the rear frame member.

8. The apparatus of claim 7 wherein the actuator is provided by an extendable hydraulic cylinder pivotally attached at one end to the lower pivot axis and pivotally attached at the opposite end thereof to the front base or to the rear base.

9. The apparatus of claim 7 wherein the upper front arm is pivotally attached to the front base at a first pivot axis and the upper rear arm is pivotally attached to the rear base at a second pivot axis, and wherein the extendable hydraulic cylinder is pivotally attached at the opposite end thereof to the first pivot axis or to the second pivot axis.

10. The apparatus of claim 1 wherein the front frame member moves upwards and forward from the operating position to the idle position and the rear frame member moves upwards and rearwards from the operating position to the idle position.

* * * * *